Jan. 3, 1961

R. E. FRIEDRICH 2,967,221

CIRCUIT INTERRUPTER

Filed Sept. 14, 1956

8 Sheets-Sheet 1

WITNESSES

Robert C. Baird

Wm. C. Groome

INVENTOR

Robert E. Friedrich.

BY

Willard R. Crout

ATTORNEY

Jan. 3, 1961

R. E. FRIEDRICH 2,967,221

CIRCUIT INTERRUPTER

Filed Sept. 14, 1956

8 Sheets-Sheet 2

Jan. 3, 1961

R. E. FRIEDRICH 2,967,221

CIRCUIT INTERRUPTER

Filed Sept. 14, 1956

8 Sheets-Sheet 5

Jan. 3, 1961 R. E. FRIEDRICH 2,967,221

CIRCUIT INTERRUPTER

Filed Sept. 14, 1956 8 Sheets-Sheet 6

Jan. 3, 1961

R. E. FRIEDRICH 2,967,221

CIRCUIT INTERRUPTER

Filed Sept. 14, 1956

8 Sheets-Sheet 8

United States Patent Office 2,967,221
Patented Jan. 3, 1961

2,967,221
CIRCUIT INTERRUPTER

Robert E. Friedrich, Baldwin Borough, Pa., assignor to Westinghouse Electric Corporation, East Pittsburgh, Pa., a corporation of Pennsylvania Filed Sept. 14, 1956, Ser. No. 609,915
11 Claims. (Cl. 200—145)

This invention relates to circuit interrupters in general and, more particularly, to arc-extinguishing structures and mounting arrangements therefor.

With the realization of today's growing loads and system expansion, the existing subtransmission or "middle voltage" circuits, such for example as those at 23 to 69 kv., are virtually becoming distribution circuits serving many distribution substations. Service continuity on such circuits needs to be made more certain to permit growing load and system expansion. In order to assure this service continuity, and to do it economically, is the problem solved by the automatic circuit reclosure for use on the "middle voltage" circuits, with which the present invention is, in part, concerned.

It is a general object of the present invention to provide an improved lower-cost circuit interrupter described herein, in one form, as an automatic circuit reclosure for voltages for which more expensive oil circuit breakers had formerly been used.

It is an additional object of the invention to provide an improved circuit interrupter which may be readily mounted, and parts of which may be readily disassembled, without disturbing the other component parts of the interrupter.

It is a more specific object of the present invention to provide an improved circuit interrupter of the single-bushing type, in which the structure is so mounted as to enable the single terminal bushing to be withdrawn vertically downwardly for replacement or repair.

Still another object is to provide an improved circuit interrupter having such a mounting arrangement as to permit dropping a current transformer downwardly over the terminal bushing without interfering with the terminal bushing.

Still a further object of the invention is to provide an improved circuit interrupter in which the interrupting element, or arc-extinguishing structure, may be removed from the upper end of the surrounding casing without disturbing the mechanism, terminal bushing, or other component parts of the interrupter, which will remain fixed to the lower end of the casing in an undisturbed state.

In single-bushing circuit interrupters of the type set out in U.S. Patent 2,534,920, issued December 19, 1950 to Leon R. Ludwig and Benjamin P. Baker; U.S. Patent 2,479,381, issued August 16, 1949 to Leon R. Ludwig and Benjamin P. Baker; and in U.S. Patent 2,055,345, issued September 22, 1936, it will be noted that in the structure of all of these patents the stationary and movable contacts are aligned axially with the terminal bushing, and a diagonally extending insulating operating rod is connected from the movable contact to a mechanism disposed adjacent an intermediate grounded part of the terminal bushing. In such construction it is necessary to have a somewhat complicated mechanism and universal joints, which tend to make the structure relatively expensive.

It is, therefore, still a further object of the present invention to provide an improved circuit interrupter of the single-bushing type in which a rotatable operating shaft is utilized extending within the enclosed insulating casing in a direction substantially parallel to the axis of the terminal bushing.

Still a further object of the present invention is to provide an improved circuit interrupter of the single-bushing type in which the center of the arc-extinguishing structure is off-center from the center of the terminal bushing, resulting in a construction whereby a considerable saving of space results, thereby providing a circuit interrupter of reduced dimensions.

Another object of the invention is to provide an improved circuit interrupter in which the several component parts are so intercoupled as to permit their ready disassembly, with the disassembly of one part not interfering with the other parts.

Still a further object of the invention is to provide an improved automatic circuit reclosure for the middle range of voltages, which may be used for single-pole or three-pole operation.

Although the specific circuit interrupter herein described is suitable for 46 kv. service, wherein the fault current may be as high as 3,000 amperes, it is to be clearly understood that the device is described only by way of illustration, as meeting a particular voltage and current rating, and that certain features of the interrupter are applicable to circuit interrupters of higher or lower rating, as will be readily apparent to those skilled in the art.

Still a further object of the invention is to adapt the interrupting structure of U.S. patent application Serial No. 576,876, filed April 9, 1956 by Benjamin P. Baker, and assigned to the assignee of the instant application, to circuit interrupters of lower voltage rating and having a simplified construction.

Further objects and advantages will readily become apparent upon reading the following specification taken in conjunction with the drawings, in which.

Figure 1:
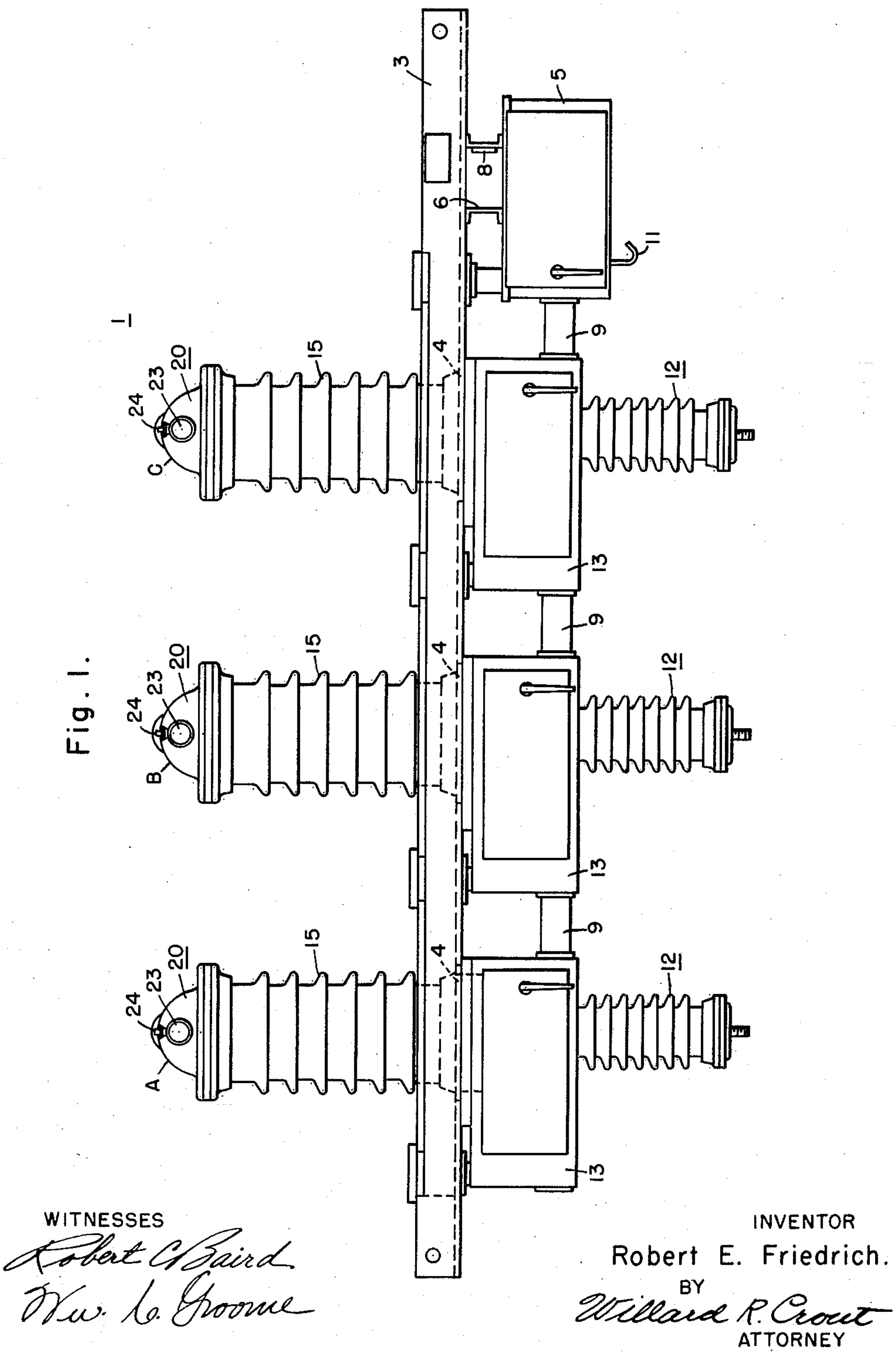
Fig. 1 is a side elevation view of a three-pole automatic circuit reclosure, embodying the principles of the present invention.
Figures 2, 3:
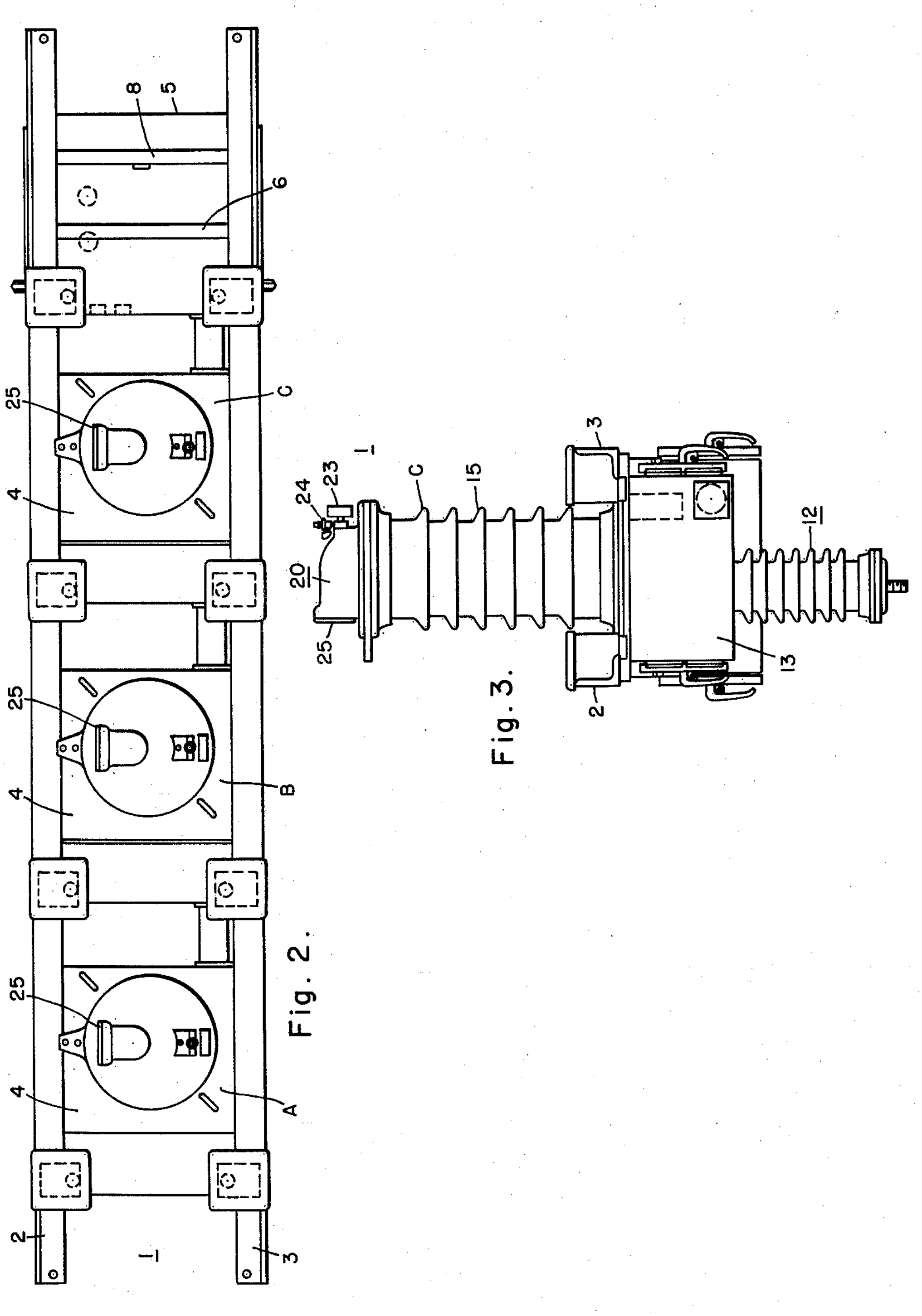
Fig. 2 is a top plan view of the three-pole circuit reclosure of Fig. 1.
Fig. 3 is an end elevational view of the circuit reclosure of Fig. 1, as viewed from the left-hand end of Fig. 1.

Referring to the drawings, and more particularly to Figs. 1–3 thereof, it will be observed that the circuit interrupter of the present invention is illustrated as of the automatic circuit reclosure type, and is generally designated by the reference numeral 1. Generally, the circuit interrupter 1 includes three-pole unit assemblies, designated by the reference letters A, B, C in Fig. 1. The pole unit assemblies A, B, C are indentical in structure, and therefore a description of the operating features of one of the pole unit assemblies will suffice for an understanding of the operation of all three of them.

As noted in Fig. 1, the pole unit assemblies A, B, C are supported upon a pair of spaced horizontally extending angle-irons 2, 3. Mounting plates 4 composed of sheet steel, are fixedly secured to the horizontally extending angle-irons 2, 3 resulting in a rigid structure. Disposed at the right-hand end of the circuit interrupter 1, as viewed in Fig. 1, is a mechanism compartment 5, secured to a pair of channel members 6, 8, which may be welded below the angle-irons 2, 3, as indicated in Fig. 1.

Generally, the mechanism compartment 5 houses a closing solenoid, not shown, which serves to actuate a horizontally extending operating rod which extends horizontally through pipes 9, interconnecting the pole units; and such horizontally extending operating rod is suitably linked to the operating mechanism 10 of each pole unit assembly. Thus, should any pole unit assembly be tripped open upon overload, or by passage of a fault current, the solenoid, within the mechanism compartment 5, will be actuated so as to move the horizontally extending operating rod, within pipes 9, to the right, effecting thereby contact reclosure in one or more pole units which have been opened by the fault current. If any pole unit assembly has opened, the solenoid mechanism will be effective to close that pole unit assembly which has opened, the other two pole unit assemblies remaining closed. The operating mechanism for the automatic circuit reclosure herein illustrated is set out, and claimed in U.S. patent application filed December 24, 1956, Serial No. 630,304, by Roswell C. Van Sickle, Fritz E. Florschutz and Joseph Sucha, and assigned to the assignee of the instant application.

The solenoid mechanism, disposed in mechanism compartment 5 is effective to reclose the pole units a number of times following repeated reopening before an integrator, not shown, functions to prevent further reclosing action of the solenoid mechanism, and permits the pole unit assemblies to remain open. The manually operable trip lever 11 may be manually engaged by an operator with a hook stick and this will effect through suitable linkage, horizontal movement of a second horizontally extending rod also passing through the pipes 9, which will trip the mechanism 10 associated with each pole unit assembly.

Figures 4, 5:
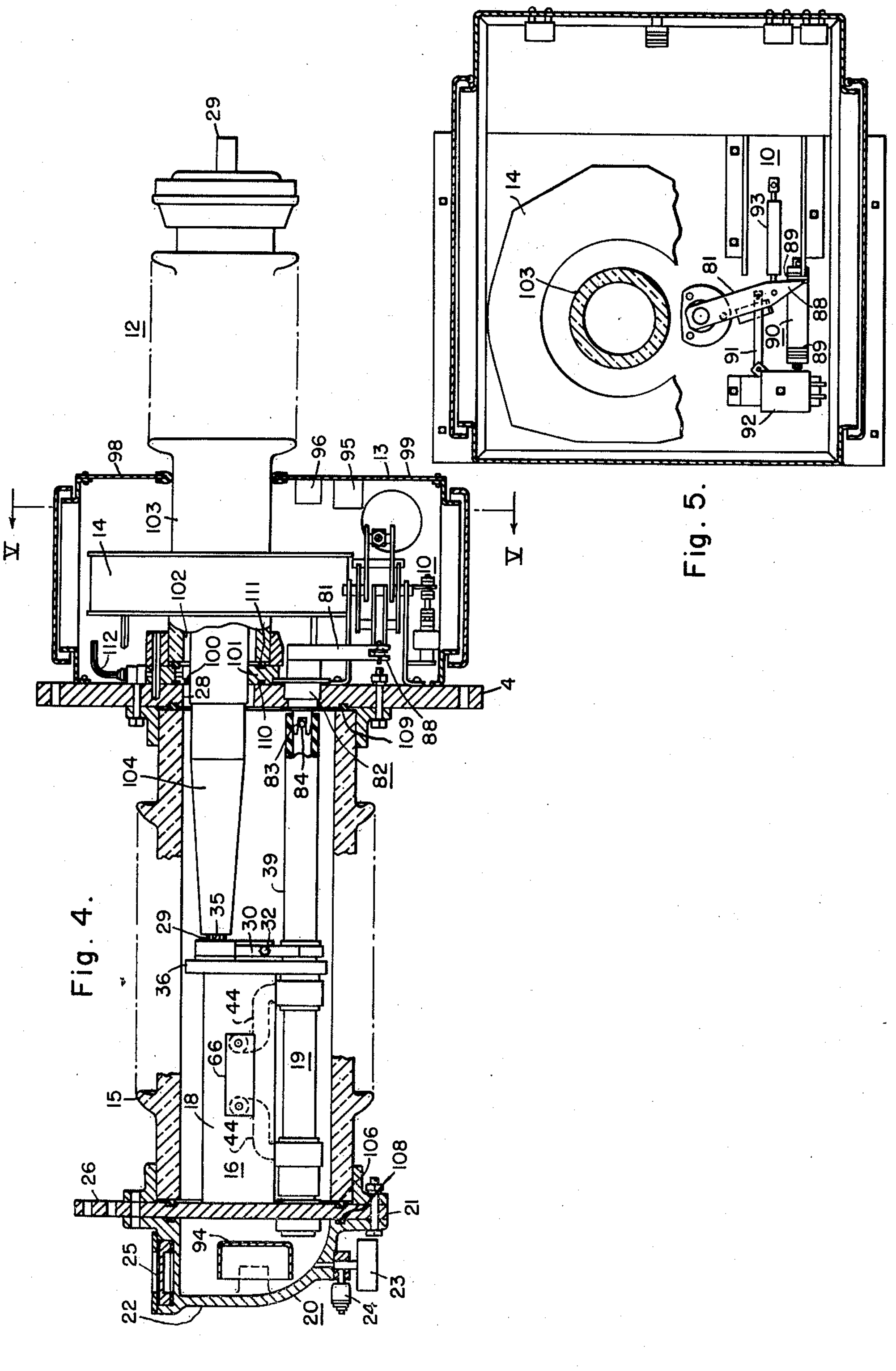
Fig. 4 is an enlarged side elevational view, partially in vertical section of one of the pole-unit assemblies, the contact structure being illustrated in the closed-circuit position.
Fig. 5 is a horizontal sectional view taken substantially along the line V—V of Fig. 4.

Referring more particularly to Figs. 3 and 4 of the drawings, it will be noted that each pole unit assembly includes a single conventional-type terminal bushing, which may be of the condenser type generally designated by the reference numeral 12, a mechanism housing 13 enclosing a current transformer 14 (Fig. 4), and an operating mechanism 10. As observed in Fig. 4, the terminal bushing 12 and the mechanism housing 13 depend from the mounting plate 4, the latter resting upon the angle-irons 2, 3, as hereinbefore described.

In addition, each pole unit assembly includes an upstanding insulating casing 15, preferably composed of a suitable weatherproof material, such as porcelain. The insulating casing 15 encloses, in a gas-tight manner, an interrupter assembly, generally designated by the reference numeral 16 and including an arc-extinguishing unit 18 and a rotatable contact structure 19.

Enclosing the upper open end of the hollow porcelain casing 15, is a cap structure, generally designated by the reference numeral 20, and including a terminal plate 21 and a cap 22. The cap structure 20 supports a pressure gauge 23, a valve 24 and a rupture disc 25. The terminal plate 21 has a terminal lug portion 26 for the reception of a transmission line cable.

Figure 6:
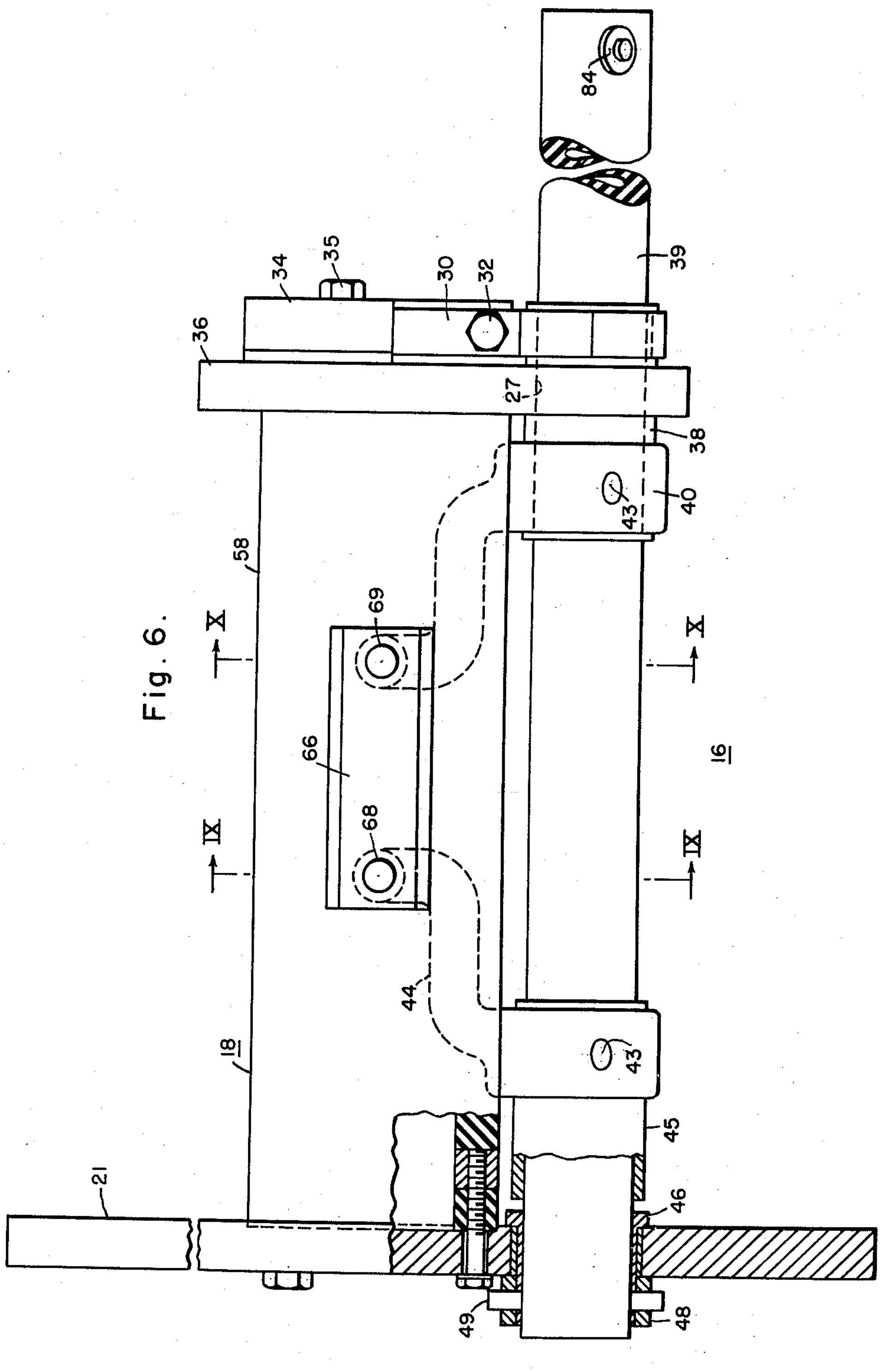
Fig. 6 is an enlarged side elevational view of the removable interrupting assemblage of one of the pole units of Fig. 1, partially broken away in vertical section and the contact structure being shown in the closed-circuit position.
Figure 12:
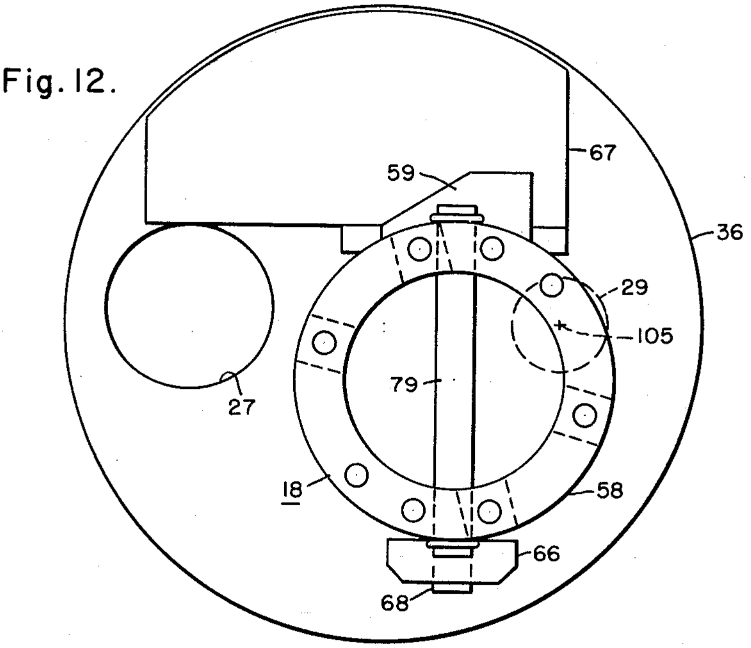
Fig. 12 is an end elevational view of the interrupting unit of Fig. 11, as viewed from the left-hand end of Fig. 11.
Figure 7:
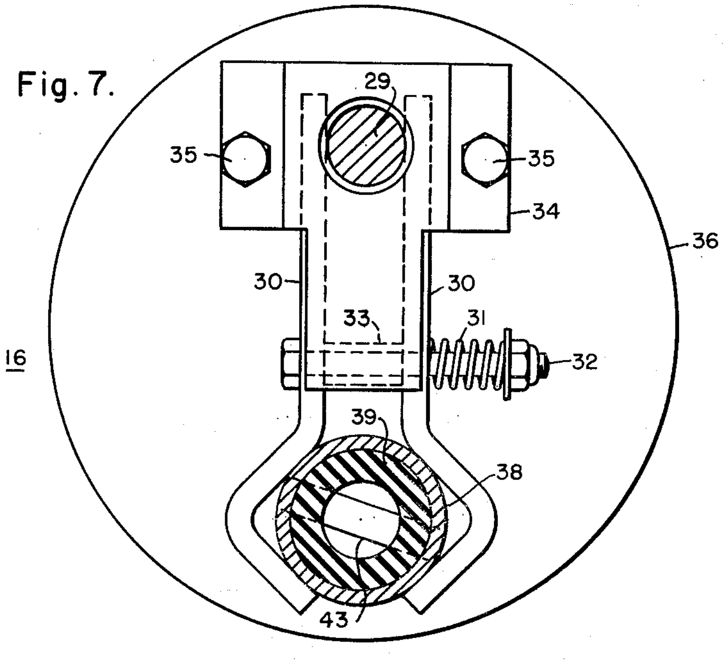
Fig. 7 is an end view of the arc-extinguishing assemblage of Fig. 6, as viewed from the right-hand end of Fig. 6.

With particular reference to Fig. 4 of the drawings, it will be observed that the terminal bushing 12 is clamped by means not shown, to the mounting plate 4 extending therethrough, through an opening 28, and having the interior end of the terminal stud 29 thereof received between a pair of contact fingers 30, more clearly shown in Fig. 7. The contact fingers 30 are biased toward each other by a compression spring 31, surrounding a bolt 32, and are spaced apart by a spacing sleeve 33. The contact fingers 30 are enclosed within a substantially T-shaped bracket member 34, bolted by bolts 35 to an insulating plate 36 as shown in Fig. 6.

Because of the finger construction including the fingers 30, the terminal stud 29 together with the terminal bushing 12, may be removed downwardly out of the mounting plate 4 for inspection or repair, without disturbing the other component parts of the pole unit assembly.

The fingers 30 are biased by the compression spring 31 into contacting engagement with a contact sleeve 38, more clearly shown in Fig. 6, which encircles the hollow insulating operating shaft 39. The contact sleeve 38 extends through an opening 27 in the insulating plate 36, and has clamped thereabout a hook-shaped movable contact 40, more clearly shown in Fig. 10 of the drawings. The hook-shaped movable contact 40 has a split sleeve clamping portion 41, which may be tightened by a clamping bolt 42 (Fig. 10) to securely hold the movable contact 40 upon the sleeve 38 and hence to the operating shaft 39. A pin 43 passes through an aperture drilled through the shaft 39 following the clamping of the movable contact 40 into place, to insure a secure and permanent clamping engagement.

Figure 15:
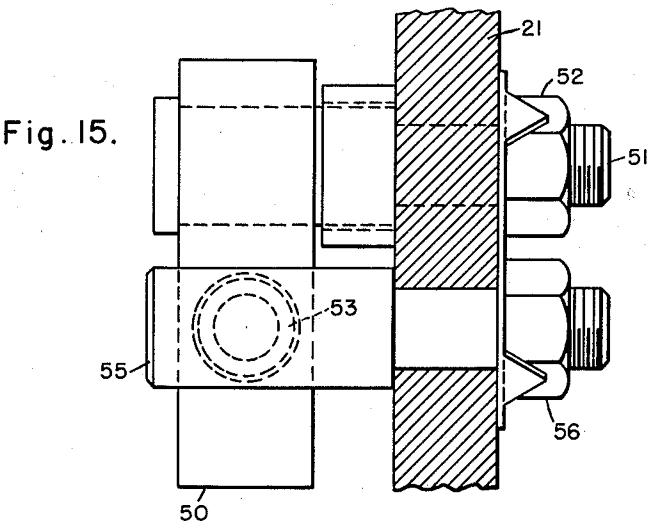
Fig. 15 is a view partially in section taken along the line XV—XV of Fig. 8.
Figure 8:
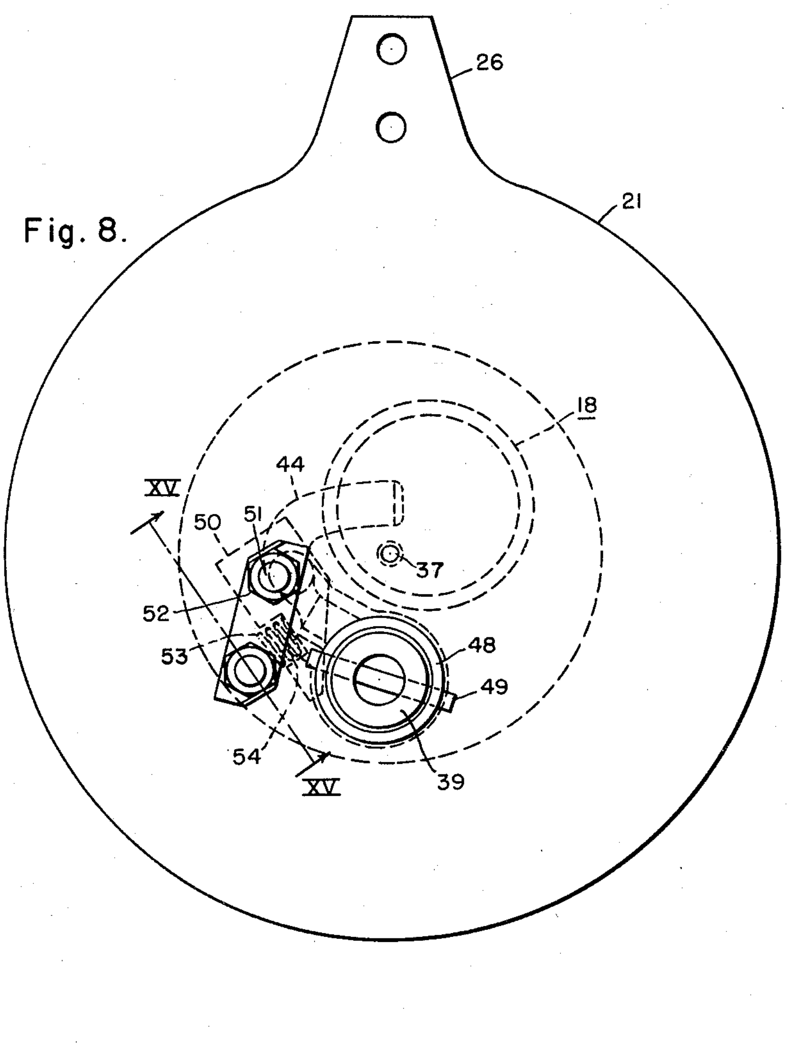
Fig. 8 is an end elevational view of the arc-extinguishing structure of Fig. 6 looking toward the left-hand end of the structure of Fig. 6, with the contact structure shown in the closed-circuit position.

Spaced axially along the shaft 39, as viewed in Fig. 6, is a second hook-shaped movable contact 44, which is clamped in a similar manner about a second contact sleeve 45. The left-hand end of the operating shaft 39, as viewed in Fig. 6, is journaled in a bearing 46 extending through the terminal plate 21. A bearing sleeve 48 is pinned to the shaft 39 by a pin 49 and serves to suspend the interrupting assembly 16 in position. The contact sleeve 45 makes contacting engagement with a pivotally mounted contact block 50 (Fig. 15), the latter being pivotally mounted upon a stud 51, which passes through the terminal plate 21, and is secured to the same by a nut 52, as shown in Fig. 15. A compression spring 53 (Fig. 8), bearing in a recess 54 of the contact block 50, biases the contact block 50 against the contact sleeve 45, making good contacting engagement therewith. The other end of the spring 53 seats against a stud 55 (Fig. 15), secured by a nut 56 to the terminal plate 21.

Figure 11:
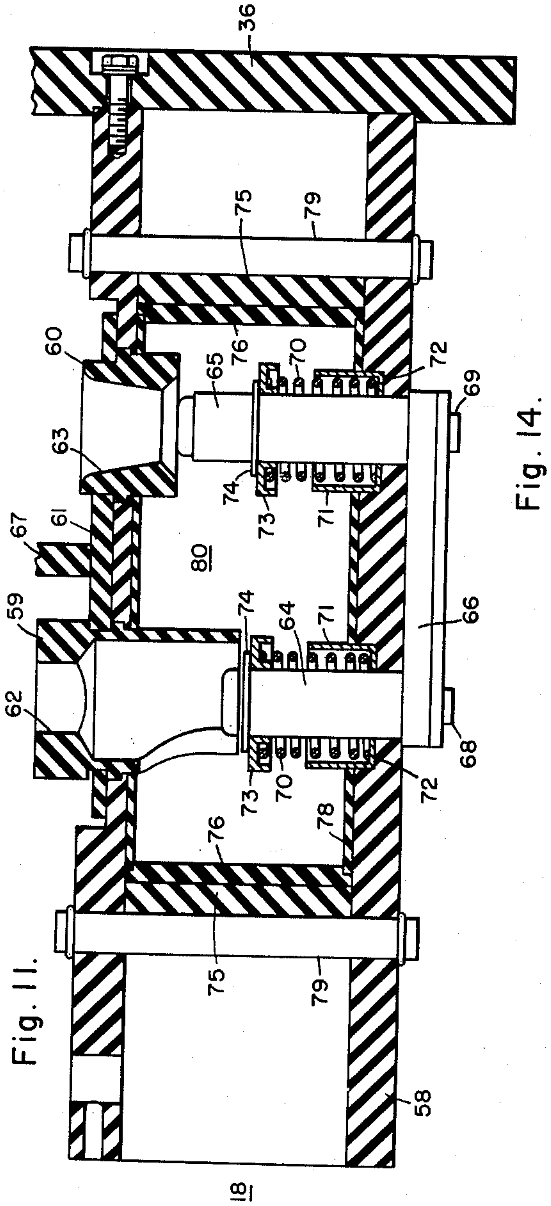
Fig. 11 is a vertical sectional view through the arc interrupting unit taken substantially along the line XI—XI of Figs. 9 and 10.

Referring to Fig. 11, it will be noted that the arc-extinguishing unit 18 is generally of tubular construction, including an insulating tube 58 having a pair of orifice members 59, 60 secured to one side thereof by a clamping plate 61. The two movable contacts 40, 44 move through the orifice openings 62, 63 of the orifice members 59, 60 respectively, and make abutting contacting engagement with a pair of relatively stationary contacts 64, 65. The relatively stationary contacts 64, 65 are electrically connected by an intermediate connecting plate 66, disposed externally of the insulating tube 58, and to which reduced portions 68, 69 of the stationary contacts 64, 65 are brazed. The stationary contacts 64, 65 are biased in the direction of the movable contacts 40, 44 by compression springs 70, having one end seated in cups 71 placed in recesses 72 in one side wall of the tube 58. The other ends of the compression springs 70 seat against annular members 73, the latter abutting locking rings 74. The locking rings 74 are snapped into recesses, not shown, provided in the stationary contacts 64, 65. A barrier plate 67 of insulating material may be positioned between the orifice members 59, 60.

To provide a substantially enclosed chamber within the insulating tube 58, a pair of circular blocks 75 of insulating material are positioned interiorly within the tube 58 against shield plates 76 of polytetrafluoroethylene. The plates 76 are spaced apart by a sleeve 78 disposed within the tube 58 and formed of the same material, serving to protect the inner surfaces of the walls of the tube 58 from the effects of arcing. Insulating pins 79, passing diametrically through the opposite side walls of the tube 58, help to secure the blocks 75 fixedly in place.

From the foregoing description, it will be apparent that the end plates 76 and the shielding sleeve 78 form a substantially enclosed arcing chamber, generally designated by the reference numeral 80, within the tube 58.

It will be apparent that in the closed-circuit position of the pole unit assembly, the circuit therethrough extends from the lower terminal stud 29, through the terminal bushing 12, to the contact fingers 30, and hence to the conducting sleeve 38. The circuit then extends through the movable contact 40, relatively stationary contact 65, connecting plate 66 to the other relatively stationary contact 64. The circuit then continues, by way of the movable contact 44, through contact sleeve 45 and contact block 50 to the stud 51 connected to the terminal plate 21. The circuit then passes through the terminal plate 21 to the terminal lug portion 26 thereof to the other transmission line connection.

During the opening operation, suitable means, not shown, are effective to unlatch the mechanism 10 associated with each pole unit assembly, or, one pole unit assembly may open independently of the other pole unit assemblies. The details of the operating mechanism 10 are set out in the aforesaid patent application Serial No. 630,304 by Roswell C. Van Sickle, Fritz E. Florschutz and Joseph Sucha, and consequently, will not be described herein. It is sufficient to state that the operation of the operating mechanism 10, as caused by the closing solenoid in mechanism compartment 5, causes rotation of a crank arm 81, which is a part of a rotatable crank arm assembly, generally designated by the reference numeral 82. The crank arm assembly 82 has a removable slotted connection, as at 83, with a pin 84, passing through the insulating operating shaft 39, as more clearly shown in Figs. 4 and 5 of the drawings.

Thus, rotation of the crank arm 81 by the operating mechanism 10 in a clockwise direction, as viewed in Fig. 5, will effect through the crank arm assembly 82 and the rotatable operating shaft 39, opening separating motion of the movable contacts 40, 44 respectively from the relatively stationary contacts 65, 64. This will establish two serially related arcs 85, 86, which are drawn in Figs. 9 and 10 respectively, even though the dotted lines 40*a*, 44*a* indicate the positions of the movable contacts 40, 44 in the fully open-circuit position.

The establishment of the arc 85 between the contacts 65 and 44 generates pressure within the arcing chamber 80. As will be brought out more fully hereinafter, the casing 15 preferably contains $SF_6$ gas under pressure, which may be about 45 pounds per square inch. The remarkable arc-extinguishing characteristics of $SF_6$ gas are set out in U.S. Patent 2,757,261, issued July 31, 1956, to Harry J. Lingal, Thomas E. Browne, Jr., and Albert P. Strom, and assigned to the assignee of the instant application.

The generation of pressure within the arcing chamber 80, by the pressure-generating arc 85, will send a blast of gas under pressure through the orifice opening 63 of the orifice member 60, and hence effect the extinction of the interrupting arc 86 drawn between the contacts 40, 64. The circuit will then be interrupted and continued rotative motion of the insulating operating shaft 39 will carry the movable contacts 40, 44 to the fully open, isolated position, as shown by the dotted lines 40*a*, 44*a* respectively of Figs. 10 and 9.

With reference to Fig. 5, it will be noted that the crank arm 81 has its outer end 88 movable between a pair of spaced washers 89 of a bumper assembly, generally designated by the reference numeral 90. A link 91 is pivotally connected between the crank arm 81 and an auxiliary switch 92, which completes the circuits for the energization of the closing solenoid. An additional link 93, shown in Fig. 5, is connected to the operating mechanism 10, certain parts of which have been omitted in Fig. 5.

To clean up any contamination of the $SF_6$ gas, which might be caused by arcing, a basket 94, suspended within the cap structure 20, contains activated alumina. The rupture disc 25 is provided to rupture upon the occurrence of excessive pressure within the casing 15, and so prevent explosion of the pole unit assembly.

Sulfur hexafluoride gas may be fed into the pole unit assembly through the valve 24 and a tapped hole 37 (Fig. 8) of plate 21 into the casing 15. The pressure of the gas within the casing 15 may be measured by means of the pressure gauge 23. Also, a counter 95, and a position indicator 96 are observable by an attendant at ground level from the bottom of the pole unit assembly, as indicated in Fig. 4.

Figure 14:
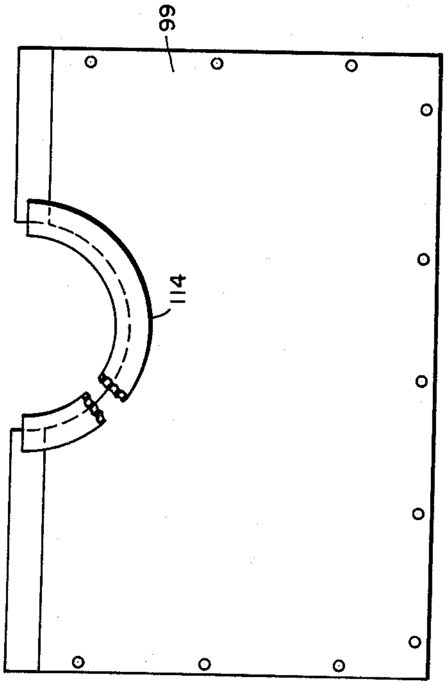
Figs. 13 and 14 illustrate the split sheet metal cover plate of the mechanism housing enclosing the current transformer for each pole unit assembly.
Figure 13:
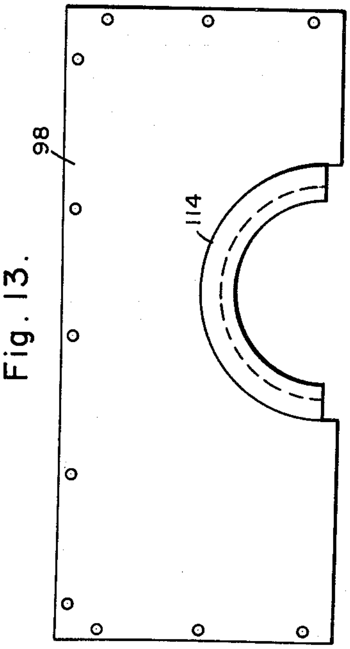

To remove the current transformer 14, one merely needs to unbolt the split cover plates 98, 99 more clearly shown in Figs. 13 and 14, from the mechanism housing 13. When the split plates 98, 99 are unbolted and removed, the current transformer 14 may be lowered downwardly over the terminal bushing 12 for inspection, or replacement. Gaskets 114 of rubber may be cemented to the plates 98, 99.

Preferably, the terminal bushing 12 has an aperture 100 provided through its clamping flange 101, so that $SF_6$ gas may seep through the aperture 100 into the region 102 within the lower casing 103 to provide the requisite dielectric strength about the condenser wrappings or insulating body 104. Thus, the same gas, namely $SF_6$, which is utilized within the casing 15 for arc-extinguishing purposes may also be used as the insulating gas for the terminal bushing 12.

The device consists of three porcelain-clad pole units mounted on two supporting channels. A solenoid operating mechanism is mounted at one end of the channels. The solenoid is connected through horizontal pull rods to a trip free lever system located at each of the pole units and thence to a contact operating lever on each pole unit. This mechanical arrangement permits of single pole reclosing operation. Normally, when the breaker pole units are in their closed position, the solenoid plunger in the coil is in what is normally called the open position. Following the opening operation of any one or more of the three-pole units, the solenoid operator is given the signal to pull to the close position any of the contact units that have opened. Following this closing operation, the solenoid operator returns once again to the open position. The lever system 10 located at each of the pole units being trip-free in nature, permits any one pole unit to open at any time during the closing stroke of the operator.

It will be apparent that instead of using a trip-free mechanism 10 associated with each pole unit, a longitudinally extending operating rod could extend across the pole units A, B, and C pivotally connected to the crank arms 81 and be operated by a conventional operating mechanism.

Figure 9:
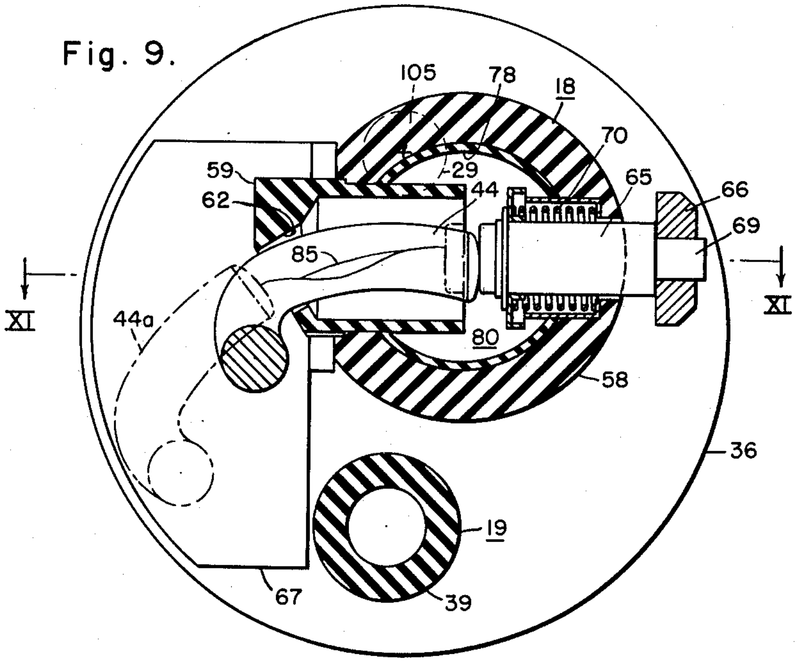
Figs. 9 and 10 are enlarged sectional views taken substantially along the lines IX—IX and X—X respectively of Fig. 6, the contact structures being shown in the closed-circuit position.
Figure 10:
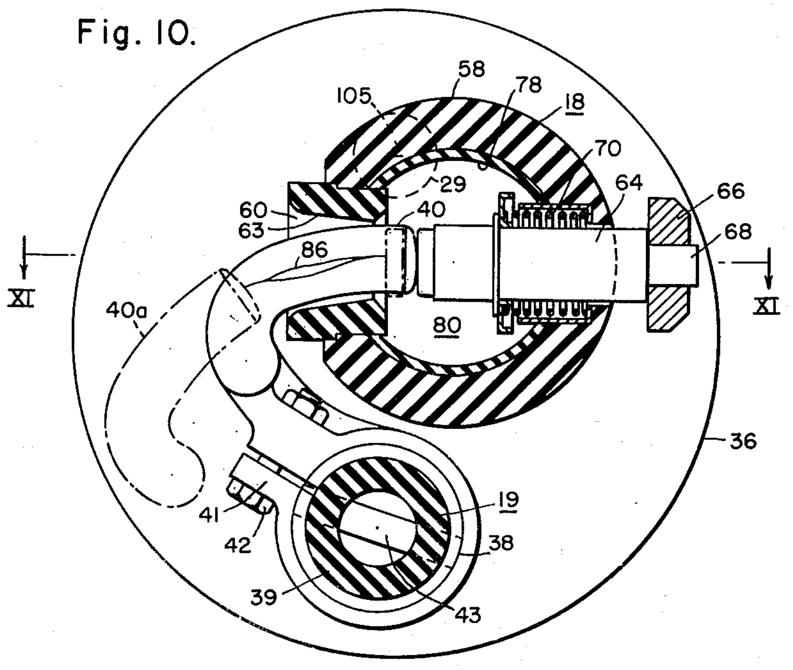

With particular reference to Figs. 9 and 10, the location of the center-line of the terminal stud 29 is indicated, as at 105. It will be noted, therefore, that the center-line of the terminal stud 29, the center-line of the rotatable operating shaft 39, and the center-line of the arc-extinguishing unit 18 are so disposed within the hollow casing 15 as to conserve space, thereby resulting in a pole unit assembly of considerably reduced dimensions. In addition, by having the stationary contact structures 64, 65 off-center from the center of the terminal stud 29, a mounting construction results whereby a straight rotatable operating shaft 39 may be utilized, eliminating any universal joints. This is a distinct advantage over circuit interrupters of the single bushing type illustrated in the prior art, wherein the contact structure was axially aligned with the terminal stud of the bushing and this resulted in the use of a diagonally extending insulating operating rod.

From the foregoing description, it will be apparent that not only may the terminal bushing 12 and the current transformer 14 be independently dropped downwardly, without interfering with the other component parts of the pole unit assembly (this following removal of the split cover 98, 99), but also the crank arm assembly 82 may be dropped downwardly from the mounting plate 4 because of the slotted connection 83 with the operating shaft 39.

In addition, upon the removal of the cap structure 20, the terminal plate 21 may be lifted upwardly, carrying with it the entire interrupting assembly 16 including the arc-extinguishing unit 18 together with the operating shaft 39. This is possible because the fingers 30 pull away from the terminal stud 29, and the lower end of the operating shaft 39 makes a pin-and-slot connection 83 with the crank arm assembly 82. Thus, the entire structure is readily assembled, and readily disassembled part by part, so that certain parts may be removed for inspection without disturbing other component parts.

Since $SF_6$ is a relatively expensive gas, and since it is desired to charge the casing 15 with this gas, at a pressure of 45 p.s.i. suitable gaskets 106, 108, 109 are associated with the casing 15 in a well-known manner to provide a gas-tight construction. Also gaskets 110, and 111 are associated with the terminal bushing 12 so that the region 102 within terminal bushing casing 103 may be gas-tight. A potential tap 112 leads out of the terminal bushing 12 in a gas-tight manner. It is expected that the gas will be maintained within the casing 15 over a long period of time without substantial loss of pressure.

From the foregoing description, it will be apparent that there is provided an improved circuit interrupter of minimum size and adapted, in the particular form illustrated, for reclosing service. By having the stationary contact structure off center from the terminal bushing, a straight rotatable shaft construction is possible, and no universal joints are needed. Assembly and disassembly of the pole unit are readily accomplished, and the device is suitable for long operational life.

Although there has been shown and described a specific structure, it is to be clearly understood that the same was merely for the purpose of illustration, and that changes and modifications may readily be made therein, by those skilled in the art, without departing from the spirit and scope of the invention.

operating shaft, means connecting one of said movable

I claim as my invention:

1. The combination in a single-bushing type of circuit interrupter of a hollow insulating casing, line terminal means disposed adjacent one end of said hollow insulating casing, a single terminal bushing extending into the other end of said hollow casing including a conductor stud, an interrupting assembly disposed interiorly within said casing including an arc-extinguishing unit and a rotatable contact shaft, means electrically connecting said interrupting assembly to said line terminal means and to said conductor stud, the axis of rotation of said rotatable contact shaft being substantially parallel to the axis of said casing, said arc-extinguishing unit including relatively stationary contact structure, said rotatable contact shaft carrying one or more movable contacts cooperable with said relatively stationary contact structure, and the center-line of said rotatable contact shaft and the center-line of said arc-extinguishing unit being off-center from each other and both off-center from the center-line of said terminal bushing to minimize the space within said hollow casing.

2. A circuit interrupter of the single-bushing type including an upstanding insulating hollow casing, line terminal means disposed adjacent the upper end of said hollow casing, a conventional-type terminal bushing extending upwardly into the lower end of said hollow casing including a conductor stud, an interrupting assembly disposed within said hollow insulating casing including an arc-extinguishing unit and a rotatable contact shaft, means electrically connecting said interrupting assembly to said line terminal means and to said conductor stud, said arc-extinguishing unit including at least one relatively stationary contact, a cooperable movable contact carried by said rotatable contact shaft, the rotatable contact shaft being substantially parallel to the axis of said hollow casing, a mounting support plate closing the lower end of the hollow casing, and bearing means supported by said mounting support plate for rotatably supporting said rotatable contact shaft.

3. The combination in a single-bushing type of circuit interrupter of a hollow insulating casing, line terminal means disposed adjacent one end of said hollow insulating casing, a single terminal bushing including a terminal stud extending into the other end of said hollow casing, an interrupting assembly disposed interiorly within said casing including an arc-extinguishing unit and a rotatable contact shaft, means electrically connecting said interrupting assembly to said line terminal means and to said terminal stud, the axis of rotation of said rotatable contact shaft being substantially parallel to the axis of said casing, said arc-extinguishing unit including relatively stationary contact structure, said rotatable contact shaft carrying one or more movable contacts, a contact sleeve encircling the rotatable contact shaft, and one or more finger contacts bearing upon said contact sleeve and also on said terminal stud running through the terminal bushing.

4. The combination in a single-bushing type of circuit interrupter of a hollow insulating casing, line terminal means disposed adjacent one end of said hollow insulating casing, a single terminal bushing including a terminal stud extending into the other end of said hollow casing, an interrupting assembly disposed interiorly within said casing including an arc-extinguishing unit and a rotatable contact shaft, means electrically connecting said interrupting assembly to said line terminal means and to said terminal stud, the axis of rotation of said rotatable contact shaft being substantially parallel to the axis of said casing, said arc-extinguishing unit including relatively stationary contact structure, said rotatable contact shaft carrying one or more movable contacts, a crank-arm assembly disposed adjacent said other end of said casing having a separable connection with one end of said rotatable contact shaft so that said rotatable contact shaft may be removed from said casing out of said one end thereof, a mounting support plate closing said other end of the hollow casing, and said mounting support plate supporting said crank-arm assembly.

5. The combination in a single-bushing type of circuit interrupter of a tubular, sealed, gas-filled, insulating housing, a line terminal disposed adjacent one end of said tubular, sealed, gas-filled housing, a single terminal bushing extending into the other end of said tubular insulating housing including a terminal stud, the center-line of said terminal bushing being off-center from the center-line of said tubular housing to minimize the space within said housing by an appreciable amount, an interrupting assembly disposed interiorly within said housing including an arc-extinguishing unit and a rotatable operating shaft, means electrically connecting said interrupting assembly to said terminal stud and to said line terminal, and a bearing plate for the rotatable operating shaft closing said other end of the housing.

6. A circuit interrupter of the single-bushing type including a tubular insulating housing, a line terminal disposed adjacent one end of said tubular insulating housing, a single terminal bushing including a terminal stud extending into the other end of said tubular insulating housing, the center-line of said terminal bushing being off-center from the center-line of said tubular housing to minimize the space within said housing by an appreciable amount, an interrupting assembly disposed interiorly within said housing including an arc-extinguishing unit and a rotatable operating shaft, a pair of movable contacts supported on said operating shaft, means connecting one of said movable contacts to said line terminal, means connecting the other movable contact to said terminal stud, said arc-extinguishing unit including a pair of relatively stationary contacts cooperable with said pair of movable contacts, means electrically connecting the two relatively stationary contacts to each other, a mounting support plate closing said other end of the tubular housing, and said mounting support plate rotatably supporting the rotatable operating shaft.

7. A circuit interrupter of the single-bushing type including a tubular, sealed, gas-filled, insulating housing, a line terminal disposed adjacent one end of said tubular, sealed, gas-filled, insulating housing, a conventional-type single terminal bushing including a terminal stud extending into the other end of said tubular, sealed, gas-filled, insulating housing, the center-line of said terminal bushing being off-center from the center-line of said tubular housing to minimize the space within said housing by an appreciable amount, an interrupting assembly disposed interiorly within said sealed, gas-filled housing including an arc-extinguishing unit and a rotatable operating shaft, a mounting support plate substantially closing one end of the tubular housing and rotatably supporting said operating shaft, a pair of movable contacts supported on said operating shaft, means connecting one of said movable contacts to said line terminal, means connecting the other movable contact to said terminal stud, said arc-extinguishing unit including a pair of relatively stationary contacts cooperable with said pair of movable contacts, and means electrically connecting the two relatively stationary contacts to each other.

8. A circuit interrupter of the single-bushing type including an insulating hollow casing, an arc-extinguishing fluid disposed within said hollow casing, line terminal means disposed adjacent one end of said hollow casing, a terminal bushing including a centrally disposed conductor stud having an isulating body disposed thereabout, means mounting said terminal bushing so that one end of said conductor stud and at least a portion of said insulating body extend into the other end of said hollow insulating casing, said terminal bushing also including an outer weather-proof casing spaced outwardly from another portion of said insulating body and extending along the other end of said conductor stud, an interrupting assembly disposed within said hollow insulating casing, said interrupting assembly including one or more relatively stationary contacts, a rotatable contact shaft extending generally parallel to said terminal bushing and carrying one or more cooperable movable contacts, means electrically connecting said interrupting assembly to said line terminal means and to said one end of said conductor stud, a crank-arm assembly disposed adjacent said other end of said hollow casing for effecting the opening and closing rotative motion of said rotatable contact shaft, means defining a separable connection between said crank-arm assembly and said rotatable contact shaft, and means providing communication for said arc-extinguishing fluid in the space within said hollow casing to the space between said outer weather-proof casing of the terminal bushing and the interiorly disposed insulating body surrounding said conductor stud.

9. A circuit interrupter of the single-bushing type including an insulating hollow casing, an arc-extinguishing fluid comprising sulfur hexafluoride gas disposed within said hollow casing, line terminal means disposed adjacent one end of said hollow casing, a terminal bushing including a centrally disposed conductor stud having an insulating body disposed thereabout, means mounting said terminal bushing so that one end of said conductor stud and at least a portion of said insulating body extends into the other end of said hollow insulating casing, said terminal bushing also including an outer weatherproof casing spaced outwardly from another portion of said insulating body and extending along the other end of said conductor stud, an interrupting assembly including a rotatable operating shaft disposed within said hollow insulating casing, a mounting support plate closing said other end of the hollow casing, the mounting support plate rotatably supporting said rotatable operating shaft, means electrically connecting said interrupting assembly to said line terminal means and to said one end of said conductor stud, and means providing communication for said arc-extinguishing fluid to the space between said outer weatherproof casing of the terminal bushing and the interiorly disposed insulating body surrounding said conductor stud.

10. A circuit interrupter of the single-bushing type including a cylindrical insulating hollow casing, line-terminal means disposed adjacent one end of said hollow cylindrical casing, a terminal bushing extending into the other end of said hollow casing adjacent the mid-portion thereof and including a conductor stud, approximately half of said terminal bushing being disposed externally of said hollow casing, a rotatable contact shaft extending into said other end of said hollow casing and carrying one or more movable contacts therewith, the axis of rotation of the contact shaft being substantially parallel to the axis of said casing, an interrupting assembly including said movable contacts disposed within said hollow insulating casing including an arc-extinguishing unit, stationary contact means associated with said arc-extinguishing unit, said one or more movable contacts cooperating with said stationary contact means to establish arcing within said arc-extinguishing unit, means electrically connecting said interrupting assembly to said line-terminal means and to said conductor stud, and the center-line of the rotatable contact shaft and the center-line of the arc-extinguishing unit both being off-center by an appreciable amount from each other and also from the axis of said hollow cylindrical casing to minimize the space within said hollow cylindrical casing.

11. A circuit interrupter of the single-bushing type including a cylindrical insulating hollow casing, line-terminal means disposed adjacent one end of said hollow cylindrical casing, a terminal bushing extending into the other end of said hollow casing adjacent the mid-portion thereof and including a conductor stud, approximately half of said terminal bushing being disposed externally of said hollow casing, a rotatable contact shaft extending into said other end of said hollow casing and carrying one or more movable contacts therewith, the axis of rotation of the contact shaft being substantially parallel to the axis of said casing, an interrupting assembly including said movable contacts disposed within said hollow insulating casing including an arc-extinguishing unit, stationary contact means associated with said arc-extinguishing unit, said one or more movable contacts cooperating with said stationary contact means to establish arcing within said arc-extinguishing unit, means electrically connecting said interrupting assembly to said line-terminal means and to said conductor stud, the center-line of the rotatable contact shaft and the center-line of the arc-extinguishing unit both being off-center by an appreciable amount from each other and also from the axis of said hollow cylindrical casing to minimize the space within said hollow cylindrical casing, and the center-line of the terminal bushing also being off-center from the axis of the hollow cylindrical casing.

References Cited in the file of this patent

UNITED STATES PATENTS

| | | |
|---|---|---|
| 976,549 | Cheney | Nov. 22, 1910 |
| 2,055,345 | Flurscheim | Sept. 22, 1936 |
| 2,163,558 | MacNeill | June 20, 1939 |
| 2,163,559 | MacNeill | June 20, 1939 |
| 2,223,901 | Scarpa | Dec. 3, 1940 |
| 2,459,600 | Strom | Jan. 18, 1949 |
| 2,467,788 | Van Sickle | Apr. 19, 1949 |
| 2,507,210 | Ludwig et al. | May 9, 1950 |
| 2,534,920 | Ludwig et al. | Dec. 19, 1950 |
| 2,809,259 | Baker et al. | Oct. 8, 1957 |

FOREIGN PATENTS

| | | |
|---|---|---|
| 370,315 | Italy | Apr. 13, 1939 |